May 20, 1969  R. A. WLEZIEN  3,444,932
SEAL ARRANGEMENTS FOR MARINE PROPELLERS
Filed Aug. 17, 1967
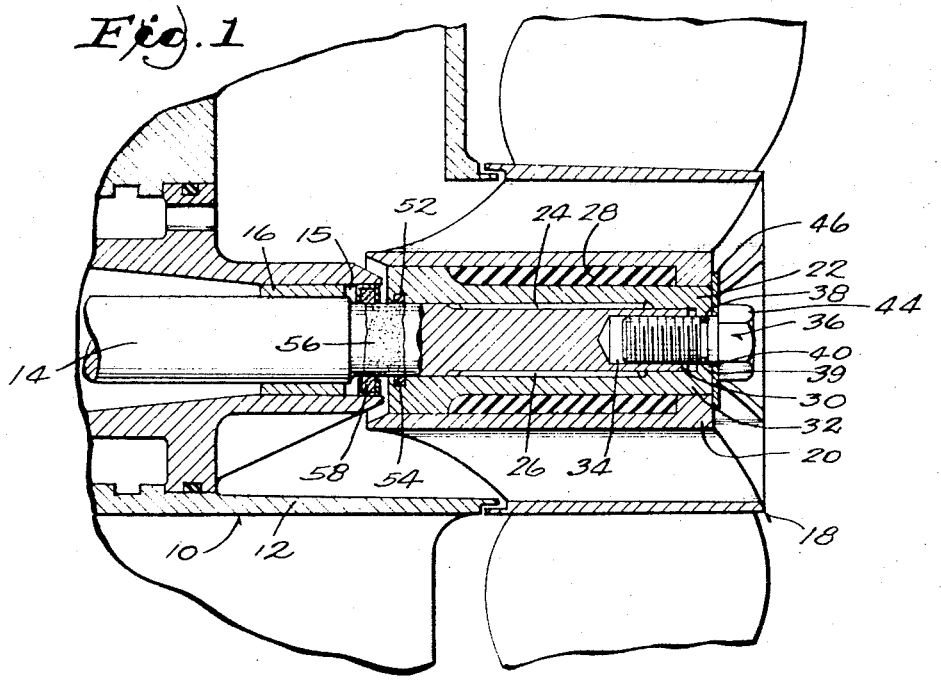
Fig. 1
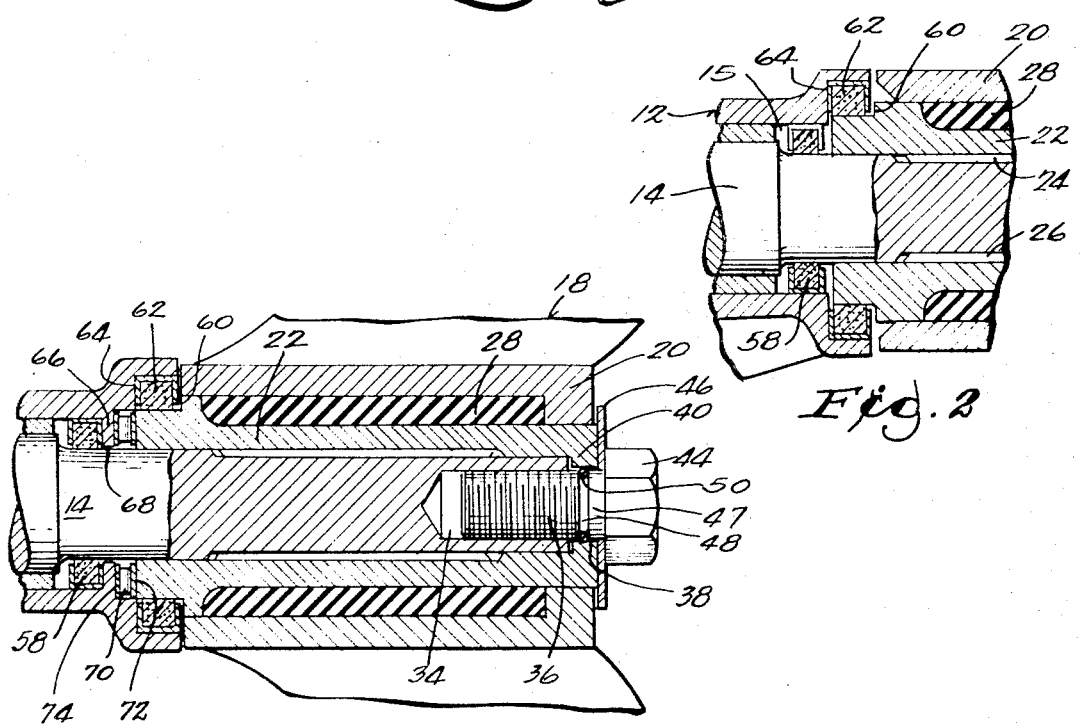
Fig. 2
Fig. 3
INVENTOR
RICHARD A. WLEZIEN
BY Wheeler, Wheeler, House & Clemency
ATTORNEYS United States Patent Office 3,444,932
Patented May 20, 1969

1

3,444,932
SEAL ARRANGEMENTS FOR MARINE PROPELLERS
Richard A. Wlezien, Niles, Ill., assignor to Outboard Marine Corporation, Waukegan, Ill., a corporation of Delaware
Filed Aug. 17, 1967, Ser. No. 661,389
Int. Cl. B63h 1/12, 3/00; B64c 11/06
U.S. Cl. 170—160.54                    7 Claims

ABSTRACT OF THE DISCLOSURE

Disclosed herein are seal arrangements for marine propulsion lower units to seal the gear case cavity and the area between the propeller hub and propeller shaft from moisture and dirt. The rearward end of the propeller hub is sealed by a bolt and washer with the bolt extending through the washer and threaded into the propeller shaft. In one seal arrangement the forward end of the propeller hub is sealed by an O-ring located in an annular groove inside the hub. In other sealing arrangements for the forward end of the propeller hub, the seal is located between the hub and the gear case head with a shoulder on the hub securing the seal in place.

Background of invention

The invention relates to seal arrangements and more particularly to seal arrangements for the propeller shaft and lower unit gear case of a marine propulsion device.

Summary of invention

The seal arrangements of the invention permit the use of a propeller shaft with little or no corrosion resistant plating and eliminate the necessity for a two-piece butt welded shaft with one of the pieces plated for corrosion resistance. The sealing arrangements of the invention prevent grit, foreign matter and moisture from entering at either end of the propeller hub and accumulating between the propeller hub and propeller shaft. In each of the disclosed sealing arrangements, the propeller hub is secured and sealed to the propeller shaft by an arrangement that includes a threaded axial aperture in the propeller shaft, an aperture in the rearward end of the hub and a corrosion resistant bolt extending through the hub and threaded into the axial aperture of the propeller shaft. The bolt head engages a corrosion resistant washer which is in engagement with the end of the propeller shaft and the end of the propeller hub. Further sealing effect at the rearward end of the hub is afforded by an O-ring or sealing member which is located in a groove in the bolt, and which bears against the aperture wall of the hub.

Three sealing arrangements are disclosed for the forward end of the propeller hub. The propeller hub disclosed to illustrate these seal constructions is of the type having an inner rotor or hub splined to the propeller shaft. The inner hub is separated from the outer hub supporting the propeller blades by an elastomeric sleeve which provides radial bias against the propeller hub and which functions as a slip clutch. In one seal construction, the inner hub is provided with an annular groove spaced inwardly from the forward end of the outer hub and which contains a slightly compressed annular ring or O-ring to seal the propeller shaft and hub. In this embodiment, a relatively narrow band or corrosion plating on the propeller shaft can be employed between the gear case head and the inner hub.

In an additional embodiment, the inner hub is provided with a stepped shoulder which provides a seat for a seal between the rotating propeller hub and the gear case head. In this embodiment, the gear case has an annular recess or counterbore of larger diameter than the gear case throat and of larger diameter than the inner hub. The recess provides a shoulder or seat for the seal which is located between the stepped shoulder on the inner hub and the recess in the gear case head.

In a further embodiment, the gear case is provided with a second counterbore or annular recess of a smaller diameter than the outer counterbore or recess to receive a thrust bearing which is located in the second recess between the gear case head and propeller hub to absorb thrusting of the propeller.

Further objects and advantages of the invention will become apparent from the following drawings and accompanying description.

Drawings

FIGURE 1 is a fragmentary sectional view of a marine propulsion lower unit gear case in accordance with one embodiment of the invention.

FIGURE 2 is a fragmentary sectional view of an additional seal arrangement.

FIGURE 3 is a fragmentary sectional view of a further sealing arrangement.

Detailed description

Referring to the drawings, there is shown a portion of a marine propulsion lower unit gear case which is generally designated 10 and which includes a gear case 12 and a propeller shaft 14. The propeller shaft 14 is rotatably supported in the throat 15 of the gear case 10 by a bearing 16.

The invention relates to seal arrangements or constructions to minimize or eliminate the need for corrosion resistant plating on propeller shafts and to prevent the entrance of moisture and grit into the propeller hub and into the gear case. Although the seal constructions of the invention can be utilized with one-piece propeller hubs, the illustrated propeller hub 18 includes an outer hub 20, and an inner hub 22 which is secured to the propeller shaft 14 by splines 24 on the propeller shaft which interfit with complementary splines 26 on the inner hub. The inner hub 22 and outer hub 20 are separated by an elastomeric ring or sleeve 28 which functions as a slip clutch to yield circumferentially under torque load due to vibration or shock.

In accordance with the invention, the rearward end 30 of the propeller shaft 14 and the rearward end 32 of the inner hub 22 are sealed to prevent grit, foreign matter and water from entering the spaces between the propeller shaft and the inner hub 22. In this regard, the propeller shaft 14 is provided with a threaded axial aperture 34 to receive a threaded corrosion resistant bolt 36 which extends through an aperture 38 defined by a wall 39 located in an inturned terminal flange 40 of the inner hub 22. The bolt head 44 seats on a corrosion resistant washer 46 which butts the inner hub 22 and the outer hub 20 which are coterminous. The bolt 36 has a shoulder 47 extending within the aperture 38, and is provided with an annular groove 48 which is located within the aperture 38. A slightly compressed O-ring or elastomeric annulus 50 is seated in the annular groove 48 and seals against the wall 39 of aperture 38.

The invention provides three seal constructions or arrangements for the forward end of the propeller hub. In FIGURE 1 entrance of moisture and grit into the inner hub 22 is prevented by a seal construction which includes an internal annular groove 52 in the inner hub 22 which receives an O-ring 54 which seals against shaft 14. In this embodiment, the shaft 14 is desirably plated in region or zone 56 to prevent corrosion due to exposure to air and water. In this embodiment, the gear case 12 is sealed by a conventional seal 58.

In an additional seal construction as shown in FIGURE 2, a seal is located between the rotating inner hub 22 and the stationary gear case 12. In this arrangement the inner hub 22 is provided with an exterior radially extending end shoulder 60 of narrower diameter than the outside diameter of hub 22. The shoulder 60 provides a seat for a radial seal 62 which is located in a counterbore or annular recess 64 in the gear case, the recess 64 being of larger diameter than the gear case throat 15. This seal 62 prevents moisture and grit from reaching the propeller shaft and eliminates the need for the corrosion resistant plating in zone 56 as shown in FIGURE 1.

In a further embodiment of the invention as illustrated in FIGURE 3, the inner hub 22 is provided with a shoulder 60 as in the embodiment disclosed in FIGURE 2. The seal 62 is located within an annular recess 64. In this embodiment. the gear case throat 15 is provided with an intuned flange 66 having an aperture 68 through which the propeller shaft 14 extends. The flange 66 provides a seat for a thrust bearing 70 located between the front face 72 of the inner hub 22 and the rear face 74 of the flange 66. Thus, the propeller thrust is transmitted to the gear case 12 and leaves the propeller shaft thrust free in forward operation. This feature permits the use of a smaller gear case bulb than the bulb conventionally used when the forward thrust bearing is located within the gear case bulb.

In all three disclosed embodiments grease can be utilized on the propeller shaft 14 in the zone 56 to afford easy removal of the propeller 18 from the shaft 14 following long periods of use.

Various of the features of the invention are set forth in the following claims.

What is claimed is:

1. In a marine propulsion lower unit including a gear case, a propeller shaft extending from said gear case, and a propeller hub on said propeller shaft, the improvement in combination therewith comprising a threaded aperture at the rearward end of said propeller shaft, an inturned flange on said propeller hub adjacent to the rearward end of said hub and adjacent to the rearward end of said propeller shaft, an aperture in said flange, a washer abutting the rearward end of said hub, a threaded bolt extending through said washer and into said aperture to clamp said washer against said hub, said bolt including an inner annular groove located within said aperture and an elastomeric ring in said groove in sealing engagement with said aperture.

2. In a marine propulsion lower unit including a gear case, a propeller shaft and propeller hub, the improvement in combination therewith comprising an annular shoulder at the forward end of said hub, a rearwardly facing annular recess on said gear case, said recess being of larger diameter than said hub and at least partially receiving said hub, sealing means located between said hub and said recess, a threaded aperture at the rearward end of said propeller shaft, an inturned flange on said propeller hub, said flange being adjacent said end of said propeller shaft, an aperture defined by a wall in said flange, a washer butting said rearward end of said hub, and a threaded bolt extending through said washer and into said threaded aperture to clamp said washer against said hub.

3. The device of claim 2 wherein said gear case has an inturned flange located forwardly of said annular recess and a thrust bearing located against said flange between said gear case and said inner hub.

4. In a marine propulsion lower unit having a gear case, a propeller shaft and a propeller hub and wherein said propeller hub has an inner hub and an outer hub with an elastomeric sleeve located between said inner and outer hubs, the improvement in combination therewith comprising an annular shoulder at the forward end of said inner hub, an annular recess on said gear case, said recess being of larger diameter than said inner hub and at least partially receiving said inner hub and sealing means located between said inner hub and said recess.

5. The device of claim 4 wherein said gear case has an inturned flange located forwardly of said annular recess and forwardly of said seal means and a thrust bearing located against said flange between said gear case and said inner hub.

6. A marine propulsion lower unit according to claim 4 including a seal located between the throat of said gear case and said propeller shaft.

7. A marine propulsion device in accordance with claim 6 wherein said gear case has an inturned flange located rearwardly of said seal in said gear case throat and a thrust bearing located against said flange between said gear case and said inner hub.

References Cited

UNITED STATES PATENTS

| | | | |
|---|---|---|---|
| 2,669,938 | 2/1954 | LaBour. | |
| 2,765,040 | 10/1956 | Darrah. | |
| 3,099,321 | 7/1963 | Watts | 170—160.53 X |
| 3,138,136 | 6/1964 | Nichols | 115—17 |
| 3,253,660 | 5/1966 | Maker | 170—160.23 X |
| 2,962,312 | 11/1960 | Wanner. | |
| 3,228,482 | 1/1966 | Bunyan | 170—173 |
| 3,232,186 | 2/1966 | Garrett et al. | 170—173 X |
| 3,246,698 | 4/1966 | Kiekhaefer. | |

FOREIGN PATENTS

| | | |
|---|---|---|
| 1,135,402 | 12/1956 | France. |
| 143,678 | 10/1963 | U.S.S.R. |
| 178,739 | 3/1962 | Sweden. |

EVERETTE A. POWELL, JR., *Primary Examiner.*

U.S. Cl. X.R.

170—173